United States Patent
Chen (10) Patent No.: US 6,438,384 B1
(45) Date of Patent: Aug. 20, 2002

(54) TELEPHONE INSTRUMENT WITH BUILT-IN MODEM DEVICE, AND SYSTEM FOR VOICE COMMUNICATIONS OVER THE INTERNET

(75) Inventor: Wu-Yueh Chen, Taichung (TW)

(73) Assignee: Qutek International Co., Ltd., Taichung City (TW)

( * ) Notice: Subject to any disclaimer, the term of this patent is extended or adjusted under 35 U.S.C. 154(b) by 0 days.

(21) Appl. No.: 09/450,246

(22) Filed: Nov. 29, 1999

(30) Foreign Application Priority Data

Dec. 19, 1998 (TW) ...................................... 87221187 U (51) Int. Cl.[7] .............................................. H04Q 7/20
(52) U.S. Cl. ................... 455/462; 455/557; 379/93.09; 379/442; 375/222
(58) Field of Search ............................... 455/462, 555, 455/556, 557, 90, 575; 379/93.01, 93.05, 93.09, 433, 434, 441, 442, 900, 902; 375/219, 222

(56) References Cited

U.S. PATENT DOCUMENTS

| 5,473,676 A | * 12/1995 | Frick et al. ............. 379/93.09 |
| 5,513,212 A | * 4/1996 | Bremer ........................ 375/222 |
| 5,684,608 A | 11/1997 | Charbonnier et al. |
| 5,761,280 A | 6/1998 | Noonen et al. |
| 5,768,351 A | * 6/1998 | England ...................... 379/442 |
| 5,838,665 A | 11/1998 | Kahn et al. |
| 5,930,719 A | * 7/1999 | Babitch et al. ............. 455/462 |
| 6,128,510 A | * 10/2000 | Beukema et al. ........... 455/557 |
| 6,289,213 B1 | * 9/2001 | Flint et al. ................... 455/556 |

* cited by examiner

Primary Examiner—Nay Maung
Assistant Examiner—Quochien B. Vuong
(74) Attorney, Agent, or Firm—Christensen O'Connor Johnson Kindness PLLC (57) ABSTRACT

A telephone instrument includes a built-in modem device that is connected electrically to a telephone line and to a data network terminal. The modem device can be activated by the data network terminal to establish communication between the data network terminal and an Internet service provider through the telephone line in response to a request to access the Internet from the data network device. A signal coder/decoder in the telephone instrument permits conversion of an outgoing call signal that was picked-up by a handset unit into encoded outgoing call data having a call data format that conforms to voice communications protocol through the Internet service provider. The signal coder/decoder further permits conversion of encoded incoming call data generated by the data network device from an incoming network signal that was received from the Internet service provider into an incoming call signal to be reproduced by the handset unit.

14 Claims, 9 Drawing Sheets

TELEPHONE INSTRUMENT WITH BUILT-IN MODEM DEVICE, AND SYSTEM FOR VOICE COMMUNICATIONS OVER THE INTERNET

BACKGROUND OF THE INVENTION

1. Field of the Invention

The invention relates to a telephone instrument, more particularly to a telephone instrument with a built-in modem, and to a system for voice communications over the Internet.

2. Description of the Related Art

The Internet is the most widely used means for data communications throughout the world. With the use of the Internet, the cost of data communications has been reduced to the cost of connecting with a local Internet service provider.

To be able to access the Internet, a data network terminal, such as a computer, is connected to a telephone line via a modem. Without the presence of an adapter, the telephone line must be disconnected from the modem and then connected to a telephone instrument in order to be able to make a regular telephone call over a public switched telephone network. The act of switching connection of the telephone line between the modem and the telephone instrument is troublesome and results in a great deal of inconvenience to the user.

The use of a data network terminal for voice communications over the Internet is known in the art. With the appropriate software, the data network terminal can digitize the caller's voice via a sound card, and then send the same in the form of an outgoing electronic mail using a standard modem over the Internet. The data network terminal can further reconstruct an incoming call from an incoming electronic mail for reproduction by the sound card. Through the Internet, the cost of making international calls can be dramatically reduced.

However, the conventional system for voice communications over the Internet suffers from some drawbacks. For instance, aside from a modem, the data network terminal must be provided with a sound card to make voice communications over the Internet possible. In addition, since sound pick-up and reproduction are accomplished via a microphone and a speaker that are connected to the sound card, the freedom of movement of the user is confined to within the vicinity of the data network terminal.

SUMMARY OF THE INVENTION

Therefore, the main object of the present invention is to provide a telephone instrument with a built-in modem device that is adapted to establish communication between a data network terminal and an Internet service provider through a telephone line.

Another object of the present invention is to provide a telephone instrument of the aforesaid type that can be used in a system for voice communications over the Internet.

A further object of the present invention is to provide a telephone instrument of the aforesaid type that has a cordless handset unit so that voice communication over the Internet can be made without severely limiting the freedom of movement of the user.

According to one aspect of the invention, a telephone instrument is adapted to be connected to a data network terminal and comprises:

a handset unit adapted for picking-up an outgoing call signal and for reproducing an incoming call signal;

a telephone base circuit operably associated with the handset unit for providing the incoming call signal to and for receiving the outgoing call signal from the handset unit; and a modem device connected electrically to the telephone base circuit and operable in one of a voice transmission mode and a data transmission mode, the modem device including telephone line connection means adapted to terminate one end of a telephone line, network connection means adapted to establish data communication with the data network terminal, signal routing means for routing signals among the telephone base circuit, the network connection means and the telephone line connection means, voice/data detecting means adapted for initiating operation of the modem device in the voice transmission mode, wherein the signal routing means routes the outgoing call signal from the telephone base circuit to the telephone line via the telephone line connection means, and wherein the signal routing means routes the incoming call signal received from the telephone line via the telephone line connection means to the telephone base circuit, and data communications means adapted to be activated by the data network terminal to operate the modem device in the data transmission mode, wherein the data communications means establishes communication between the data network terminal and an Internet service provider through the telephone line in response to a request to access the Internet from the data network terminal.

Preferably, the telephone instrument further comprises a signal coder/decoder connected electrically to the modem device. The data communications means is further adapted to be activated by the data network terminal to operate the modem device in an Internet voice communications mode. In the Internet voice communications mode, the signal routing means routes the outgoing call signal from the telephone base circuit to the signal coder/decoder. Then, the signal coder/decoder converts the outgoing call signal into encoded outgoing call data having a call data format that conforms to voice communications protocol through the Internet service provider. Subsequently, the signal routing means routes the encoded outgoing call data from the signal coder/decoder to the network connection means for reception by the data network terminal so that the encoded outgoing call data can be further converted into an encoded outgoing network signal having a network signal format that conforms to signal transmission protocol through the Internet service provider. Thereafter, the signal routing means routes the encoded outgoing network signal received from the data network terminal via the network connection means to the telephone line connection means for reception by the Internet service provider via the telephone line. Further, the signal routing means routes an encoded incoming network signal received by the telephone line connection means from the Internet service provider through the telephone line to the network connection means for reception by the data network terminal so that the encoded incoming network signal can be converted into encoded incoming call data. Then, the signal routing means routes the encoded incoming call data received from the data network terminal via the network connection means to the signal coder/decoder. Subsequently, the signal coder/decoder converts the encoded incoming call data into the incoming call signal. Thereafter, the signal routing means routes the incoming call signal from the signal coder/decoder to the telephone base circuit.

According to another aspect of the invention, a cordless handset is adapted to be connected to a data network terminal and comprises:

a wireless handset circuit adapted for picking-up an outgoing call signal and for reproducing an incoming call signal, the handset circuit being operable in a voice transmission mode, wherein the wireless handset circuit is adapted to form a wireless communications link with a telephone base unit for providing the outgoing call signal to and for receiving the incoming call signal from the telephone base unit; and a modem device connected electrically to the handset circuit, the modem device including telephone line connection means adapted to terminate one end of a telephone line, network connection means adapted to establish data communication with the data network terminal, signal routing means for routing signals among the handset circuit, the network connection means and the telephone line connection means, and data communications means adapted to be activated by the data network terminal to operate the modem device in a data transmission mode, wherein the modem device disables operation of the handset circuit in the voice transmission mode, and wherein the data communications means establishes communication between the data network terminal and an Internet service provider through the telephone line in response to a request to access the Internet from the data network terminal.

Preferably, the cordless handset further comprises a signal coder/decoder connected electrically to the modem device. The data communications means is further adapted to be activated by the data network terminal to operate the modem device in an Internet voice communications mode. In the Internet voice communications mode, the signal routing means routes the outgoing call signal from the handset circuit to the signal coder/decoder. Then, the signal coder/decoder converts the outgoing call signal into encoded outgoing call data having a call data format that conforms to voice communications protocol through the Internet service provider. Subsequently, the signal routing means routes the encoded outgoing call data from the signal coder/decoder to the network connection means for reception by the data network terminal so that the encoded outgoing call data can be further converted into an encoded outgoing network signal having a network signal format that conforms to signal transmission protocol through the Internet service provider. Thereafter, the signal routing means routes the encoded outgoing network signal received from the data network terminal via the network connection means to the telephone line connection means for reception by the Internet service provider via the telephone line. Further, the signal routing means routes an encoded incoming network signal received by the telephone line connection means from the Internet service provider through the telephone line to the network connection means for reception by the data network terminal so that the encoded incoming network signal can be converted into encoded incoming call data. Then, the signal routing means routes the encoded incoming call data received from the data network terminal via the network connection means to the signal coder/decoder. Subsequently, the signal coder/decoder converts the encoded incoming call data into the incoming call signal. Thereafter, the signal routing means routes the incoming call signal from the signal coder/decoder to the handset circuit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 1:
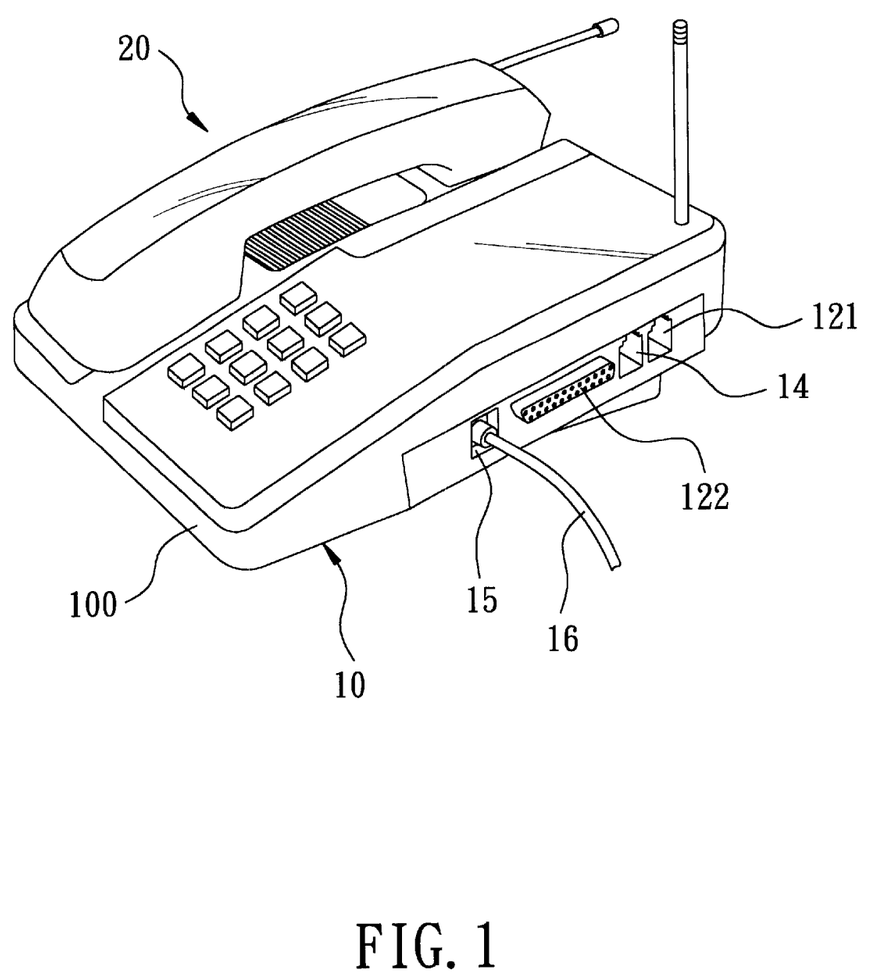
FIG. 1 is a perspective view illustrating the first preferred embodiment of a telephone instrument according to the present invention.
Figure 2:
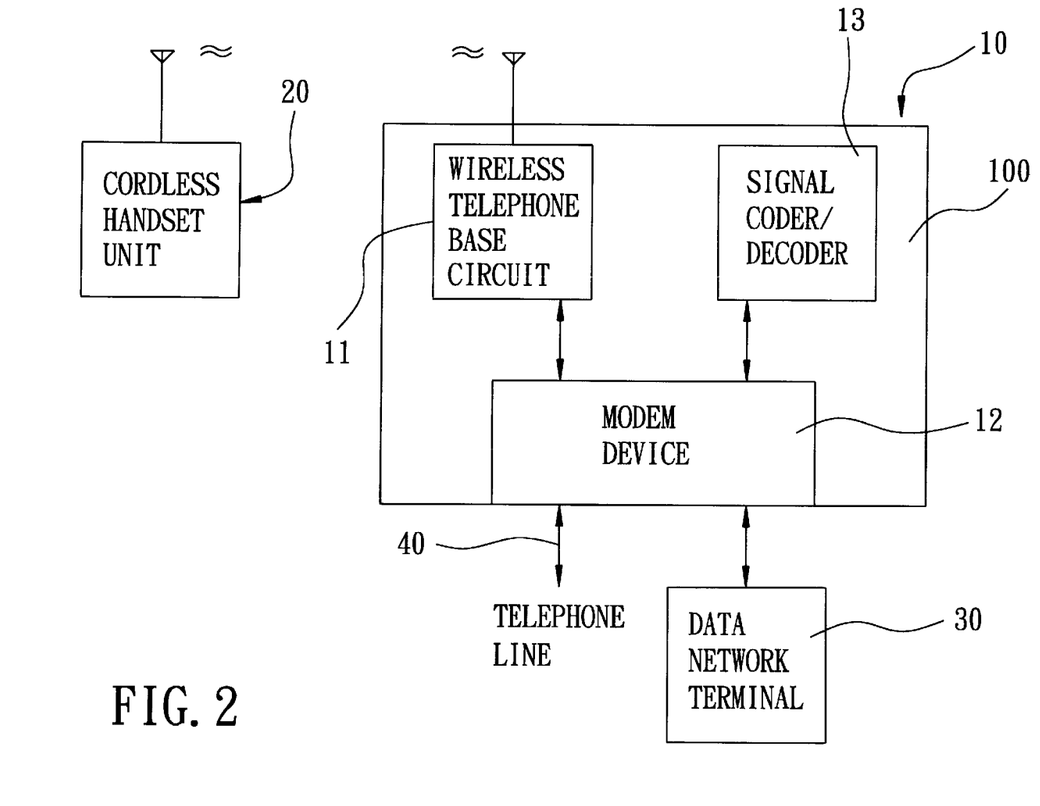
FIG. 2 is a schematic circuit block diagram illustrating a system for making voice communications over the Internet using the telephone instrument of the first preferred embodiment.

Referring to FIGS. 1 and 2, the first preferred embodiment of a telephone instrument according to the present invention is shown to comprise a telephone base unit 10 and a cordless handset unit 20.

The cordless handset unit 20 is a standard handset unit that is adapted to pick-up an outgoing call signal and reproduce an incoming call signal.

The telephone base unit 10 includes a base housing 100, and a wireless telephone base circuit 11, a modem device 12 and a signal coder/decoder 13 mounted inside the base housing 100.

The telephone base circuit 11 is capable of forming a wireless communications link with the handset unit 20 in a known manner, and provides the incoming call signal to and receives the outgoing call signal from the handset unit 20.

Figure 3:
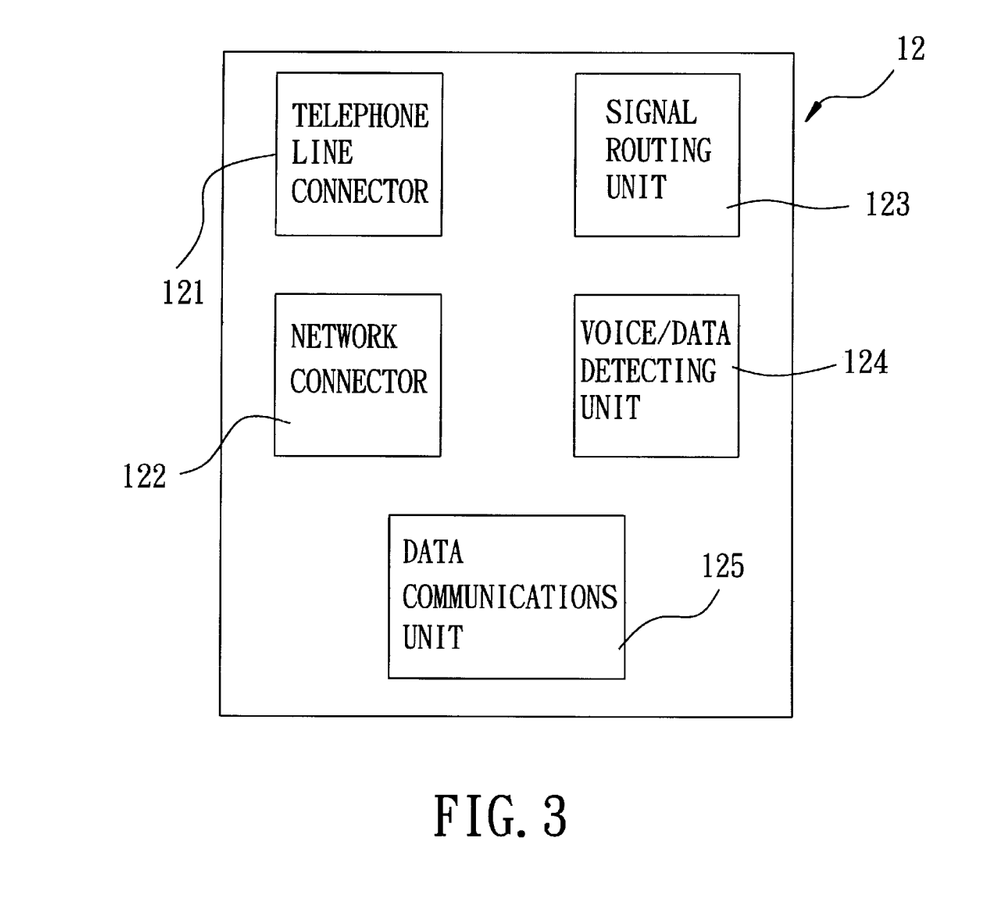
FIG. 3 is a schematic circuit block illustrating a modem device of the first preferred embodiment.

The modem device 12 is connected electrically to the telephone base circuit 11 and is operable in one of a voice transmission mode and a data transmission mode. As shown in FIG. 3, the modem device 12 includes a telephone line connector 121, a network connector 122, a signal routing unit 123, a voice/data detecting unit 124, and a data communications unit 125.

With reference to FIGS. 2 and 3, the telephone line connector 121 is mounted on the base housing 100 (see FIG. 1) and is adapted to terminate one end of a telephone line 40.

The network connector 122 is mounted on the base housing 100 (see FIG. 1) and is adapted to establish data communication with a data network terminal 30, such as a computer. In this embodiment, the network connector 122 is a serial port connector.

The signal routing unit 123 is responsible for routing signals among the telephone base circuit 11, the network connector 122 and the telephone line connector 122.

The voice/data detecting unit 124 is adapted for initiating operation of the modem device 12 in the voice transmission mode. In this mode, the signal routing unit 123 routes the outgoing call signal from the telephone base circuit 11 to the telephone line 40 via the telephone line connector 122, and routes the incoming call signal received from the telephone line 40 via the telephone line connector 122 to the telephone base circuit 11. A preferred embodiment of the voice/data detecting unit 124 is one that is found in conventional facsimile machines capable of handling both voice and data transmissions.

The data communications unit 125 is adapted to be activated by the data network terminal 30 to operate the modem device 12 in the data transmission mode. This can be done by executing a dial-up routine in the data network terminal 30 in a conventional manner. In the data transmission mode, the data communications unit 125 establishes communication between the data network terminal 30 and an Internet service provider through the telephone line 40 in response to a request to access the Internet from the data network terminal 30. Once communication is established, web browsing and data transmission can be conducted at this time.

Referring once again to FIGS. 2 and 3, the signal coder/decoder 13 is connected electrically to the modem device 12. The data communications unit 125 is further adapted to be activated by the data network terminal 30 to operate the modem device 12 in an Internet voice communications mode. This can be done by executing appropriate voice communications software in the data network terminal 30 in a known manner.

In the Internet voice communications mode, the outgoing call signal from the telephone base circuit 11 can be sent to the Internet service provider in the form of an electronic mail. Further, an encoded incoming network signal received from the Internet service provider can be reconstructed into the incoming call signal that is provided to the telephone base circuit 11.

Figure 4:
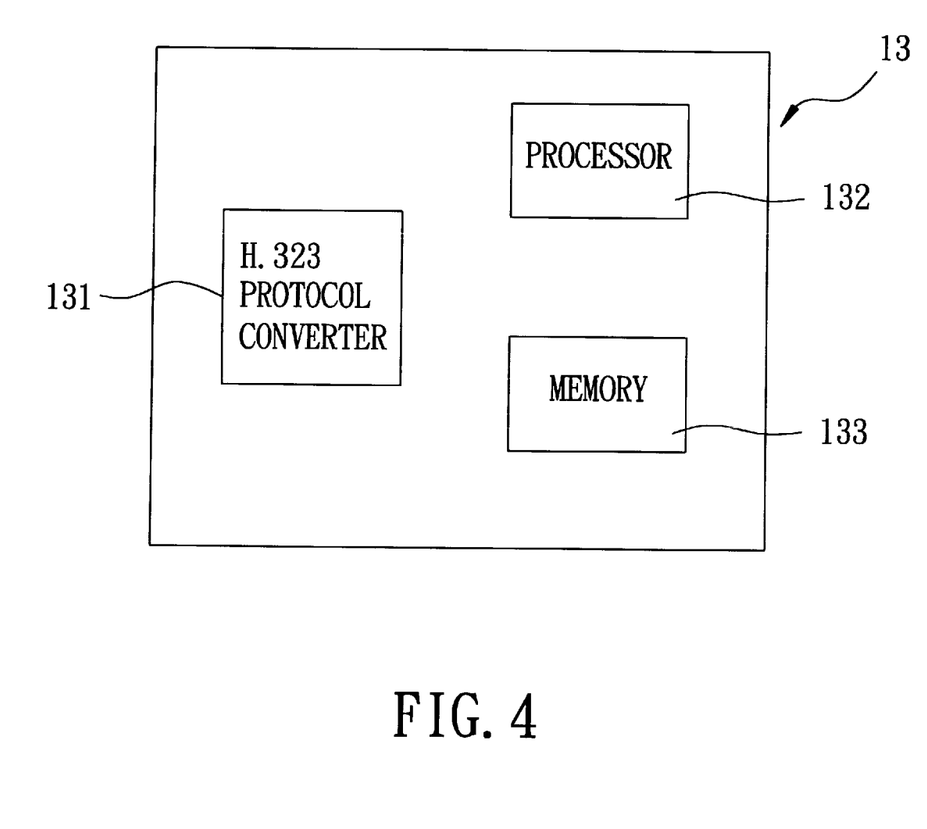
FIG. 4 is a schematic circuit block diagram illustrating a signal coder/decoder of the first preferred embodiment.

When sending an outgoing call signal over the Internet, the signal routing unit 123 initially routes the outgoing call signal picked-up by the handset unit 20 from the telephone base circuit 11 to the signal coder/decoder 13. Then, the signal coder/decoder 13 converts the outgoing call signal into encoded outgoing call data having a call data format that conforms to voice communications protocol through the Internet service provider. In this embodiment, the voice communications protocol is the H.323 Internet phone communications protocol. As shown in FIG. 4, the signal coder/decoder 13 is constructed using an H.323 protocol converter 131, a processor 132, and a memory unit 133 formed from volatile and non-volatile memory chips for storage of both programs and data.

Subsequently, as shown in FIGS. 2 and 3, the signal routing unit 123 routes the encoded outgoing call data from the signal coder/decoder 13 to the network connector 122 for reception by the data network terminal 30 so that the encoded outgoing call data can be further converted into an encoded outgoing network signal having a network signal format that conforms to signal transmission protocol through the Internet service provider. Thereafter, the signal routing unit 123 routes the encoded outgoing network signal received from the data network terminal 30 via the network connector 122 to the telephone line connector 121 for reception by the Internet service provider via the telephone line 40.

When receiving an incoming call signal over the Internet, the signal routing unit 123 routes an encoded incoming network signal received by the telephone line connector 121 from the Internet service provider through the telephone line 40 to the network connector 122 for reception by the data network terminal 30 so that the encoded incoming network signal can be converted into encoded incoming call data. Then, the signal routing unit 123 routes the encoded incoming call data received from the data network terminal 30 via the network connector 122 to the signal coder/decoder 13. Subsequently, the signal coder/decoder 13 converts the encoded incoming call data into the incoming call signal. Thereafter, the signal routing unit 123 routes the incoming call signal from the signal coder/decoder 13 to the telephone base circuit 11 for reproduction by the handset unit 20.

It should be noted that the tasks of the signal coder/decoder 13 in the telephone instrument of this invention are normally accomplished by the data network terminal in the conventional system for voice communications over the Internet. Since the voice communications protocol conversion is no longer executed by the data network terminal 30, the speed of the latter when performing voice communications over the Internet can be enhanced. In addition, since a sound card is no longer needed for sound pick-up and reproduction, the presence of echo when making calls over the Internet can be minimized.

Referring once again to FIG. 1, the telephone base unit 10 can be optionally provided with a socket 14 that is mounted on the base housing 100 for electrical connection with another handset, a telephone instrument or a facsimile machine (not shown) in a known manner. In addition, the base housing 100 can be further provided with a power supply input 15 for connection to a power cord 16, thereby permitting the supply of electrical power to the telephone base unit 10.

Figure 5:
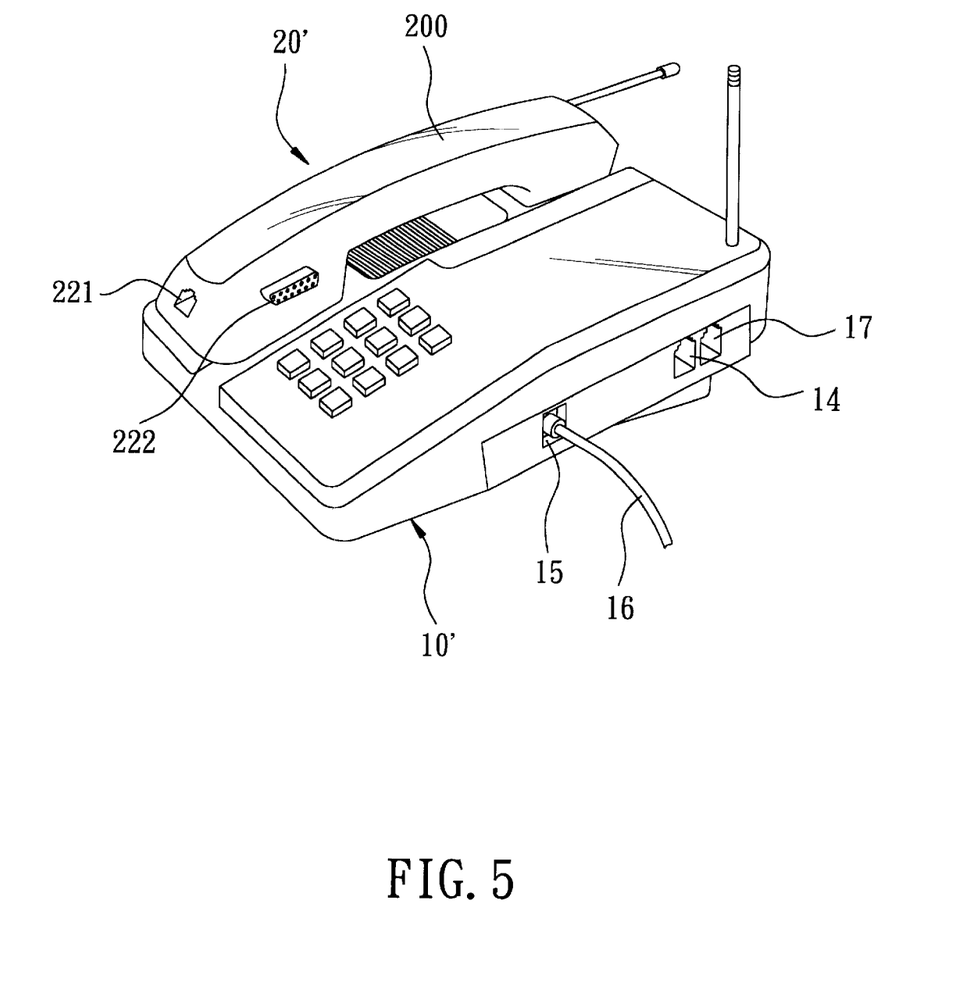
FIG. 5 is a perspective view illustrating the second preferred embodiment of a telephone instrument according to the present invention.
Figure 6:
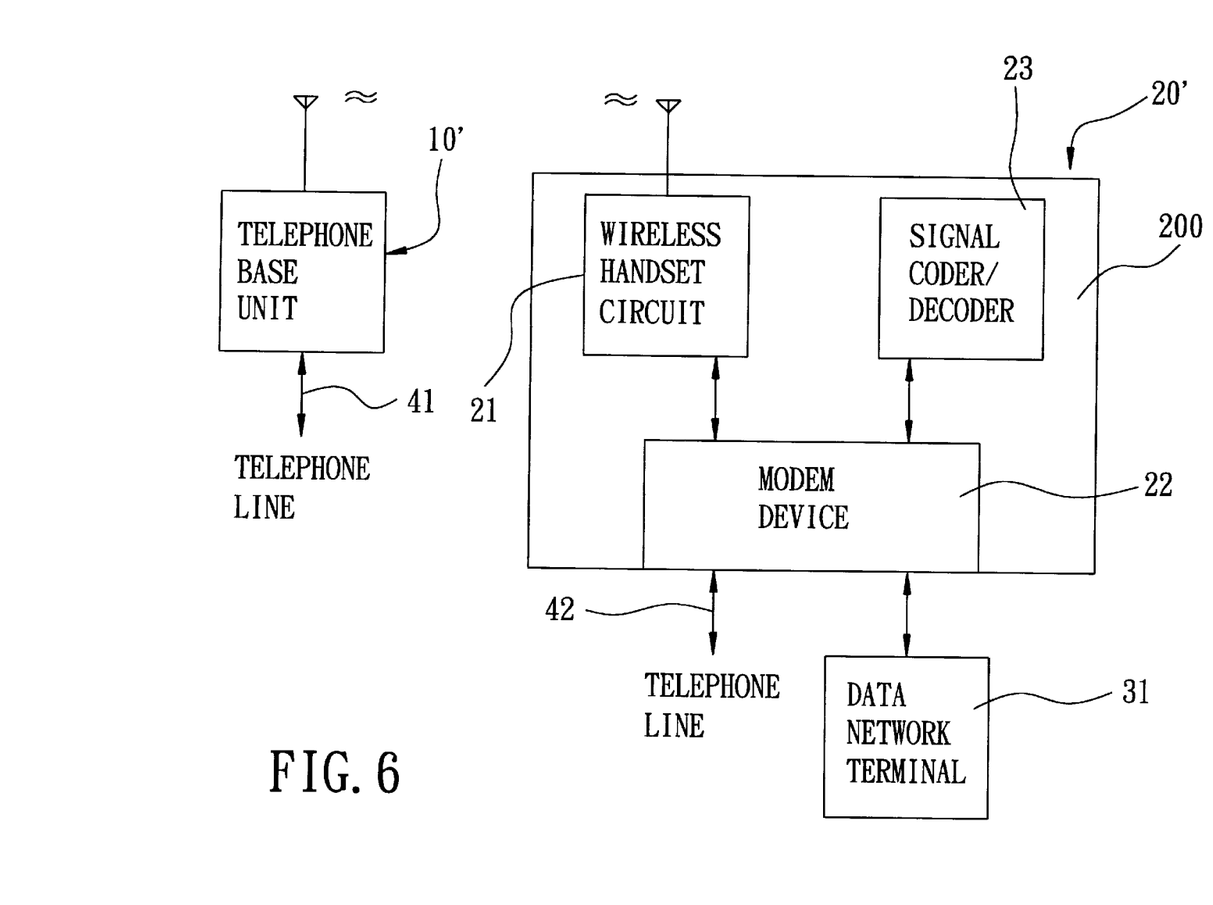
FIG. 6 is a schematic circuit block diagram illustrating a system for making voice communications over the Internet using the telephone instrument of the second preferred embodiment.

Referring to FIGS. 5 and 6, the second preferred embodiment of a telephone instrument according to the present invention is shown to comprise a telephone base unit 10' and a cordless handset unit 20'.

The telephone base unit 10' is a standard telephone base unit that is provided with a telephone line connector 17 adapted for terminating one end of a telephone line 41. Thus, transmission of incoming and outgoing call signals through the telephone line 41 can be accomplished via the telephone base unit 10' in a conventional manner.

The cordless handset unit 20' includes a handheld housing 200, and a wireless handset circuit 21, a modem device 22 and a signal coder/decoder 23 mounted inside the handheld housing 200.

The wireless handset circuit 21 is capable of picking-up an outgoing call signal and of reproducing an incoming call signal in a conventional manner. The handset circuit 21 is operable in a voice transmission mode, wherein the handset circuit 21 is adapted to form a wireless communications link with the telephone base unit 10' for providing the outgoing call signal to and for receiving the incoming call signal from the telephone line 41 via the telephone base unit 10'.

Figure 7:
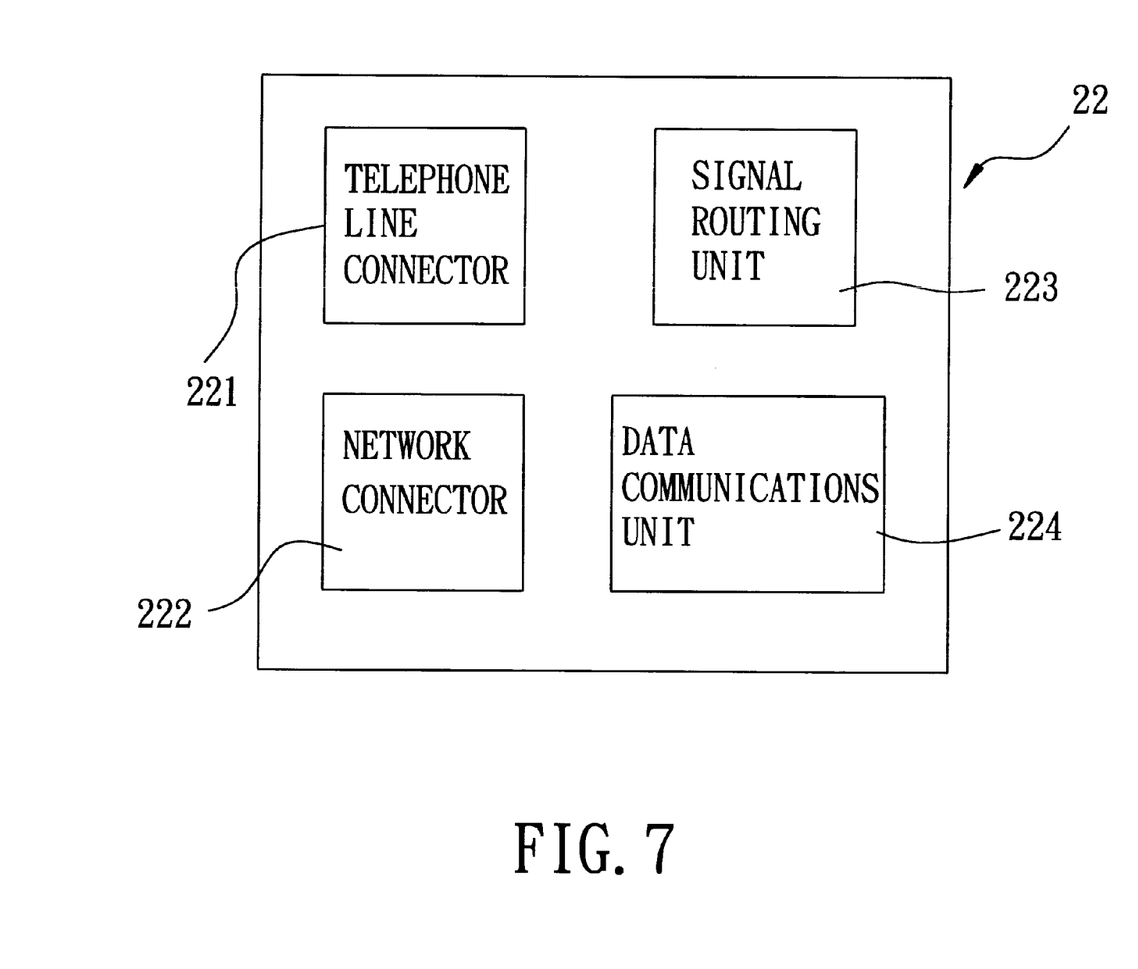
FIG. 7 is a schematic circuit block diagram of a modem device of the second preferred embodiment.

The modem device 22 is connected electrically to the handset circuit 21. As shown in FIG. 7, the modem device 22 includes a telephone line connector 221, a network connector 222, a signal routing unit 223, and a data communications unit 224.

With reference to FIGS. 6 and 7, the telephone line connector 221 is mounted on the handheld housing 200 (see FIG. 5) and is adapted to terminate one end of another telephone line 42.

The network connector 222 is mounted on the handheld housing 200 (see FIG. 5) and is adapted to establish data communication with a data network terminal 31, such as a computer. In this embodiment, the network connector 222 is a serial port connector.

The signal routing unit 223 is responsible for routing signals among the handset circuit 21, the network connector 222 and the telephone line connector 221.

The data communications unit 224 is adapted to be activated by the data network terminal 31 to operate the modem device 22 in a data transmission mode. This can be done by executing a dial-up routine in the data network terminal 31 in a conventional manner 30. In the data transmission mode, the modem device 22 disables operation of the handset circuit 21 in the voice transmission mode, thereby breaking the communications link with the telephone base unit 10'. At the same time, the data communications unit 224 establishes communication between the data network terminal 31 and an Internet service provider through the telephone line 42 in response to a request to access the Internet from the data network terminal 31. Once communication is established, web browsing and data transmission through the handset unit 20' can be conducted at this time.

Referring once again to FIGS. 6 and 7, the signal coder/decoder 23 is connected electrically to the modem device 22. The data communications unit 224 is further adapted to be activated by the data network terminal 31 to operate the modem device 22 in an Internet voice communications mode. This can be done by executing appropriate voice communications software in the data network terminal 31 in a known manner.

In the Internet voice communications mode, the outgoing signal from the handset circuit 21 can be sent to the Internet service provider in the form of an electronic mail. Further, an encoded incoming network signal received from the Internet service provider can be reconstructed into the incoming call signal that is provided to the handset circuit 21.

When sending an outgoing call signal over the Internet, the signal routing unit 223 initially routes the outgoing call signal from the handset circuit 21 to the signal coder/decoder 23. Then, the signal coder/decoder 23, which is similar to the signal coder/decoder 13 of the first preferred embodiment, converts the outgoing call signal into encoded outgoing call data having a call data format that conforms to voice communications protocol, i.e. H.323 Internet phone communications protocol, through the Internet service provider. Subsequently, the signal routing unit 223 routes the encoded outgoing call data from the signal coder/decoder 23 to the network connector 222 for reception by the data network terminal 31 so that the encoded outgoing call data can be further converted into an encoded outgoing network signal having a network signal format that conforms to signal transmission protocol through the Internet service provider. Thereafter, the signal routing unit 223 routes the encoded outgoing network signal received from the data network terminal 31 via the network connector 222 to the telephone line connector 221 for reception by the Internet service provider via the telephone line 42.

When receiving an incoming call signal over the Internet, the signal routing unit 223 routes an encoded incoming network signal received by the telephone line connector 221 from the Internet service provider through the telephone line 42 to the network connector 222 for reception by the data network terminal 31 so that the encoded incoming network signal can be converted into encoded incoming call data. Then, the signal routing unit 223 routes the encoded incoming call data received from the data network terminal 31 via the network connector 222 to the signal coder/decoder 23. Subsequently, the signal coder/decoder 23 converts the encoded incoming call data into the incoming call signal. Thereafter, the signal routing unit 223 routes the incoming call signal from the signal coder/decoder 23 to the handset circuit 21 for reproduction.

Figure 8:
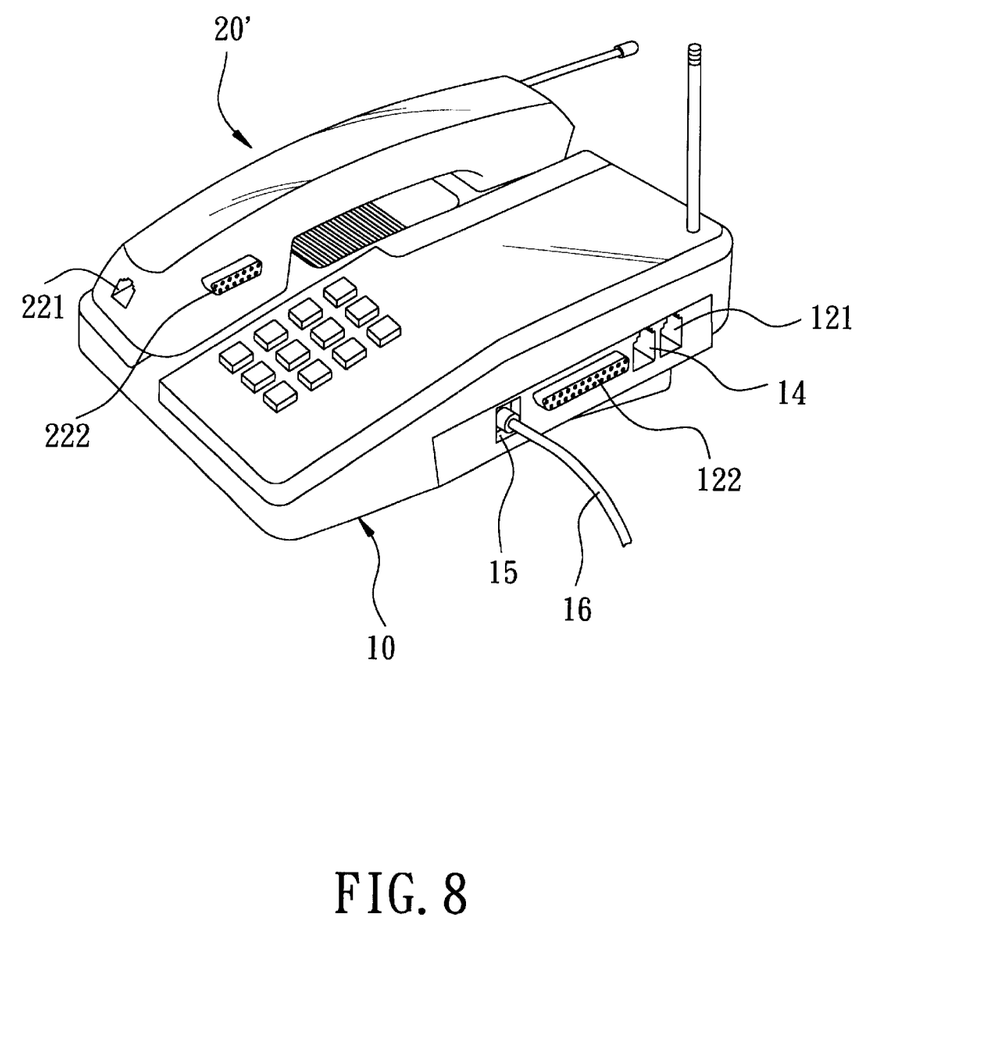
FIG. 8 is a perspective view illustrating the third preferred embodiment of a telephone instrument according to the present invention.
Figure 9:
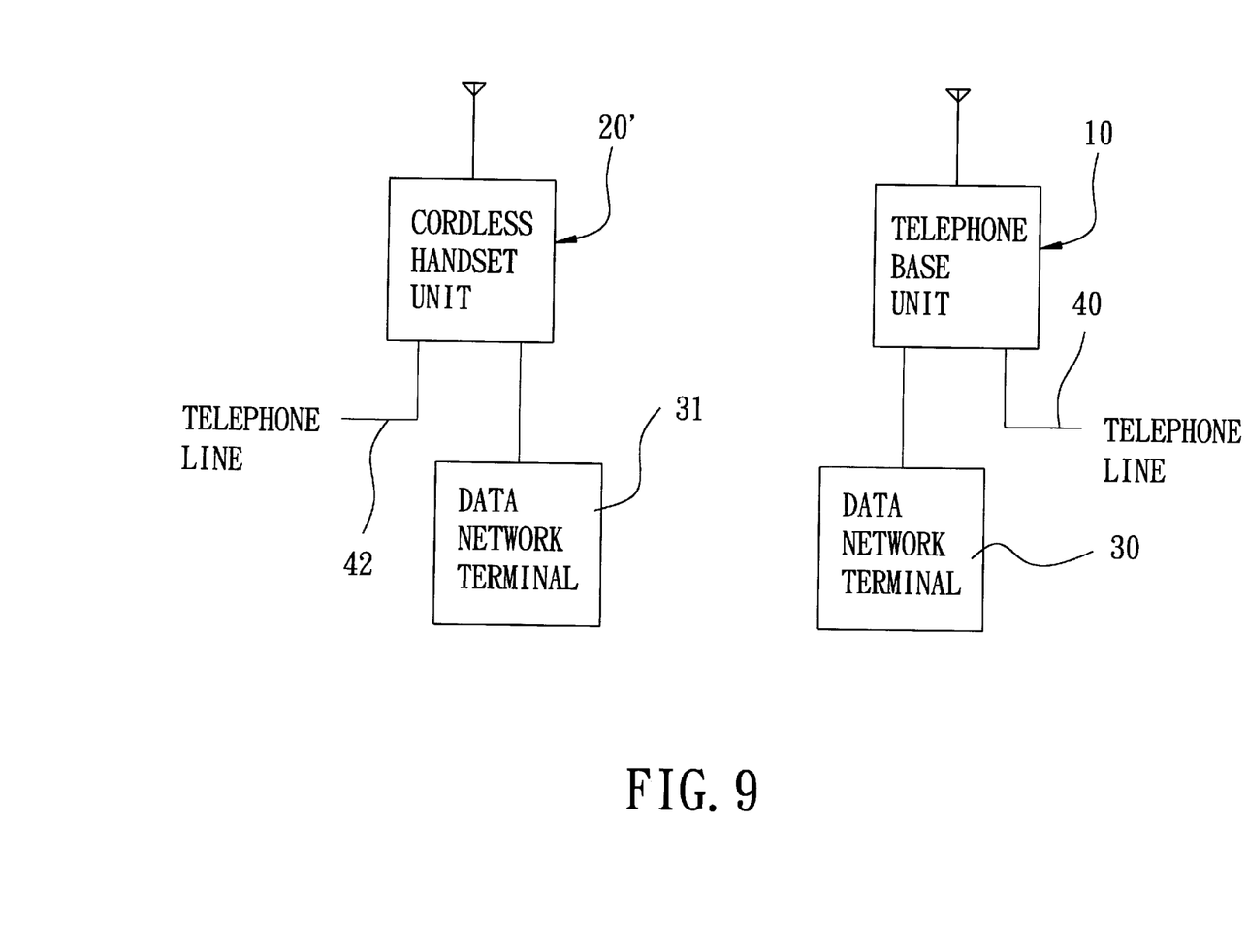
FIG. 9 is a schematic diagram illustrating the third preferred embodiment in a state of use.

Referring to FIGS. 8 and 9, the third preferred embodiment of a telephone instrument according to the present invention is shown to comprise the telephone base unit 10 of the first preferred embodiment, and the cordless handset unit 20' of the second preferred embodiment. The telephone base unit 10 can be connected to a first telephone line 40 and a first data network terminal 30, and can be operated to establish communication between the data network terminal 30 and an Internet service provider through the telephone line 40 in response to a request to access the Internet from the data network terminal 30. The handset unit 20' can be connected to a second telephone line 42 and a second data network terminal 31, and can be operated to establish communication between the data network terminal 31 and an Internet service provider through the telephone line 42 in response to a request to access the Internet from the data network terminal 31. The telephone instrument of the third preferred embodiment thus permits two data network terminals 30, 31 to access the Internet simultaneously. In the preferred embodiment, when the handset unit 20' is used for voice communications over the Internet, the telephone base unit 10 can only be used by the data network terminal 30 for web browsing and data transmission purposes.

It has thus been shown that the telephone instrument of this invention is capable of establishing communication between a data network terminal and an Internet service provider through a telephone line. The handset unit of the telephone instrument can also serve to replace a sound card of the data network terminal during voice communications over the Internet. Moreover, because the handset unit is cordless, voice communication over the Internet can be made without severely limiting the freedom of movement of the user. The objects of the present invention are thus met.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A telephone instrument adapted to be connected to a data network terminal, comprising:

a handset unit adapted for picking-up an outgoing call signal and for reproducing an incoming call signal;

a telephone base circuit operably associated with said handset unit for providing the incoming call signal to and for receiving the outgoing call signal from said handset unit; and a modem device connected electrically to said telephone base circuit and operable in one of a voice transmission mode and a data transmission mode, said modem device including telephone line connection means adapted to terminate one end of a telephone line, network connection means adapted to establish data communication with the data network terminal, signal routing means for routing signals among said telephone base circuit, said network connection means and said telephone line connection means, voice/data detecting means adapted for initiating operation of said modem device in the voice transmission mode, wherein said signal routing means routes the outgoing call signal from said telephone base circuit to the telephone line via said telephone line connection means, and wherein said signal routing means routes the incoming call signal received from the telephone line via said telephone line connection means to said telephone base circuit, and data communications means adapted to be activated by the data network terminal to operate said modem device in the data transmission mode, wherein said data communications means establishes communication between the data network terminal and an Internet service provider through the telephone line in response to a request to access the Internet from the data network terminal.

2. The telephone instrument of claim 1, further comprising a signal coder/decoder connected electrically to said modem device, said data communications means being further adapted to be activated by the data network terminal to operate said modem device in an Internet voice communications mode, wherein said signal routing means routes the outgoing call signal from said telephone base circuit to said signal coder/decoder, wherein said signal coder/decoder converts the outgoing call signal into encoded outgoing call data having a call data format that conforms to voice communications protocol through the Internet service provider, wherein said signal routing means routes the encoded outgoing call data from said signal coder/decoder to said network connection means for reception by the data network terminal so that the encoded outgoing call data can be further converted into an encoded outgoing network signal having a network signal format that conforms to signal transmission protocol through the Internet service provider, wherein said signal routing means routes the encoded outgoing network signal received from the data network terminal via said network connection means to said telephone line connection means for reception by the Internet service provider via the telephone line, wherein said signal routing means routes an encoded incoming network signal received by said telephone line connection means from the Internet service provider through the telephone line to said network connection means for reception by the data network terminal so that the encoded incoming network signal can be converted into encoded incoming call data, wherein said signal routing means routes the encoded incoming call data received from the data network terminal via said network connection means to said signal coder/decoder, wherein said signal coder/decoder converts the encoded incoming call data into the incoming call signal, and wherein said signal routing means routes the incoming call signal from said signal coder/decoder to said telephone base circuit.

3. The telephone instrument of claim 2, wherein said handset unit is a cordless handset unit, and said telephone base circuit is a wireless telephone base circuit capable of forming a wireless communications link with said handset unit.

4. The telephone instrument of claim 3, further comprising a base housing having said telephone base circuit, said modem device, and said signal coder/decoder mounted therein.

5. A cordless handset adapted to be connected to a data network terminal, comprising:

a wireless handset circuit adapted for picking-up an outgoing call signal and for reproducing an incoming call signal, said handset circuit being operable in a voice transmission mode, wherein said wireless handset circuit is adapted to form a wireless communications link with a telephone base unit for providing the outgoing call signal to and for receiving the incoming call signal from the telephone base unit; and a modem device connected electrically to said handset circuit, said modem device including telephone line connection means adapted to terminate one end of a telephone line, network connection means adapted to establish data communication with the data network terminal, signal routing means for routing signals among said handset circuit, said network connection means and said telephone line connection means, and data communications means adapted to be activated by the data network terminal to operate said modem device in a data transmission mode, wherein said modem device disables operation of said handset circuit in the voice transmission mode, and wherein said data communications means establishes communication between the data network terminal and an Internet service provider through the telephone line in response to a request to access the Internet from the data network terminal.

6. The cordless handset of claim 1, further comprising a signal coder/decoder connected electrically to said modem device, said data communications means being further adapted to be activated by the data network terminal to operate said modem device in an Internet voice communications mode, wherein said signal routing means routes the outgoing call signal from said handset circuit to said signal coder/decoder, wherein said signal coder/decoder converts the outgoing call signal into encoded outgoing call data having a call data format that conforms to voice communications protocol through the Internet service provider, wherein said signal routing means routes the encoded outgoing call data from said signal coder/decoder to said network connection means for reception by the data network terminal so that the encoded outgoing call data can be further converted into an encoded outgoing network signal having a network signal format that conforms to signal transmission protocol through the Internet service provider, wherein said signal routing means routes the encoded outgoing network signal received from the data network terminal via said network connection means to said telephone line connection means for reception by the Internet service provider via the telephone line, wherein said signal routing means routes an encoded incoming network signal received by said telephone line connection means from the Internet service provider through the telephone line to said network connection means for reception by the data network terminal so that the encoded incoming network signal can be converted into encoded incoming call data, wherein said signal routing means routes the encoded incoming call data received from the data network terminal via said network connection means to said signal coder/decoder, wherein said signal coder/decoder converts the encoded incoming call data into the incoming call signal, and wherein said signal routing means routes the incoming call signal from said signal coder/decoder to said handset circuit.

7. The cordless handset of claim 6, further comprising a handheld housing having said handset circuit, said modem device, and said signal coder/decoder mounted therein.

8. A system for voice communications over the Internet, comprising a data network terminal and a telephone instrument, said telephone instrument including a handset unit adapted for picking-up an outgoing call signal and for reproducing an incoming call signal, a telephone base circuit operably associated with said handset unit for providing the incoming call signal to and for receiving the outgoing call signal from said handset unit, and a modem device connected electrically to said telephone base circuit and operable in one of a voice transmission mode and a data transmission mode, said modem device including telephone line connection means adapted to terminate one end of a telephone line, network connection means for establishing data communication with said data network terminal, signal routing means for routing signals among said telephone base circuit, said network connection means and said telephone line connection means, voice/data detecting means for initiating operation of said modem device in the voice transmission mode, wherein said signal routing means routes the outgoing call signal from said telephone base circuit to the telephone line via said telephone line connection means, and wherein said signal routing means routes the incoming call signal received from the telephone line via said telephone line connection means to said telephone base circuit, and data communications means activated by said data network terminal to operate said modem device in the data transmission mode, wherein said data communications means establishes communication between said data network terminal and an Internet service provider through the telephone line in response to a request to access the Internet from said data network terminal.

9. The system of claim 8, further comprising a signal coder/decoder connected electrically to said modem device, said data communications means being further activated by said data network terminal to operate said modem device in an Internet voice communications mode, wherein said signal routing means routes the outgoing call signal from said telephone base circuit to said signal coder/decoder, wherein said signal coder/decoder converts the outgoing call signal into encoded outgoing call data having a call data format that conforms to voice communications protocol through the Internet service provider, wherein said signal routing means routes the encoded outgoing call data from said signal coder/decoder to said network connection means for reception by said data network terminal, wherein said data network terminal further converts the encoded outgoing call data into an encoded outgoing network signal having a network signal format that conforms to signal transmission protocol through the Internet service provider, wherein said signal routing means routes the encoded outgoing network signal received from said data network terminal via said network connection means to said telephone line connection means for reception by the Internet service provider via the telephone line, wherein said signal routing means routes an encoded incoming network signal received by said telephone line connection means from the Internet service provider through the telephone line to said network connection means for reception by said data network terminal, wherein said data network terminal converts the encoded incoming network signal into encoded incoming call data, wherein said signal routing means routes the encoded incoming call data received from said data network terminal via said network connection means to said signal coder/decoder, wherein said signal coder/decoder converts the encoded incoming call data into the incoming call signal, and wherein said signal routing means routes the incoming call signal from said signal coder/decoder to said telephone base circuit.

10. The system of claim 9, wherein said handset unit is a cordless handset unit, and said telephone base circuit is a wireless telephone base circuit capable of forming a wireless communications link with said handset unit.

11. The system of claim 10, further comprising a base housing having said telephone base circuit, said modem device, and said signal coder/decoder mounted therein.

12. A system for voice communications over the Internet, comprising a data network terminal and a cordless handset including a wireless handset circuit adapted for picking-up an outgoing call signal and for reproducing an incoming call signal, said handset circuit being operable in a voice transmission mode, wherein said wireless handset circuit is adapted to form a wireless communications link with a telephone base unit for providing the outgoing call signal to and for receiving the incoming call signal from the telephone base unit, said cordless handset further including a modem device connected electrically to said handset circuit, said modem device including telephone line connection means adapted to terminate one end of a telephone line, network connection means for establishing data communication with said data network terminal, signal routing means for routing signals among said handset circuit, said network connection means and said telephone line connection means, and data communications means activated by said data network terminal to operate said modem device in a data transmission mode, wherein said modem device disables operation of said handset circuit in the voice transmission mode, and wherein said data communications means establishes communication between said data network terminal and an Internet service provider through the telephone line in response to a request to access the Internet from said data network terminal.

13. The system of claim 12, further comprising a signal coder/decoder connected electrically to said modem device, said data communications means being further activated by said data network terminal to operate said modem device in an Internet voice communications mode, wherein said signal routing means routes the outgoing call signal from said handset circuit to said signal coder/decoder, wherein said signal coder/decoder converts the outgoing call signal into encoded outgoing call data having a call data format that conforms to voice communications protocol through the Internet service provider, wherein said signal routing means routes the encoded outgoing call data from said signal coder/decoder to said network connection means for reception by said data network terminal, wherein said data network terminal converts the encoded outgoing call data into an encoded outgoing network signal having a network signal format that conforms to signal transmission protocol through the Internet service provider, wherein said signal routing means routes the encoded outgoing network signal received from said data network terminal via said network connection means to said telephone line connection means for reception by the Internet service provider via the telephone line, wherein said signal routing means routes an encoded incoming network signal received by said telephone line connection means from the Internet service provider through the telephone line to said network connection means for reception by said data network terminal, wherein said data network terminal converts the encoded incoming network signal into encoded incoming call data, wherein said signal routing means routes the encoded incoming call data received from said data network terminal via said network connection means to said signal coder/decoder, wherein said signal coder/decoder converts the encoded incoming call data into the incoming call signal, and wherein said signal routing means routes the incoming call signal from said signal coder/decoder to said handset circuit.

14. The system of claim 13, further comprising a handheld housing having said handset circuit, said modem device, and said signal coder/decoder mounted therein.

* * * * *